INVENTOR
Armand Brandt
BY Pierce, Scheffler & Parker
ATTORNEYS

INVENTOR
Armand Brandt
BY Pierre Scheffler & Parker
ATTORNEYS

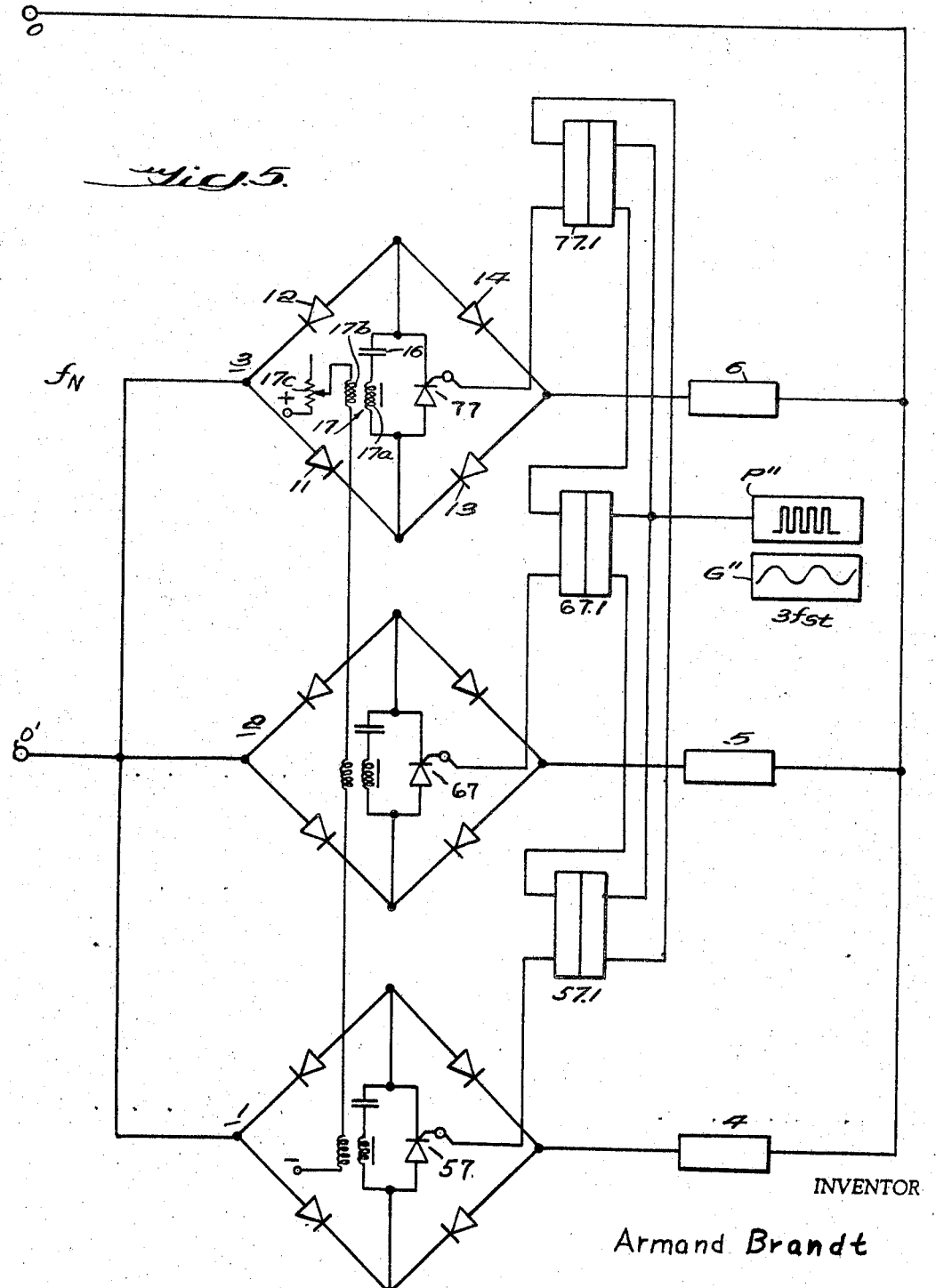

United States Patent Office 3,435,321
Patented Mar. 25, 1969

3,435,321
ELECTRICAL CONVERTER CIRCUIT FOR SUPPLY-
ING A LOAD WITH VARIABLE FREQUENCY
ALTERNATING CURRENT FROM AN ALTER-
NATING CURRENT SOURCE OF CONSTANT
FREQUENCY
Armand Brandt, Lucerne, Switzerland, assignor to
Aktiengesellschaft Brown, Boveri & Cie, Baden,
Switzerland
Filed Nov. 17, 1966, Ser. No. 595,160
Claims priority, application Switzerland, Nov. 18, 1965,
15,925/65
Int. Cl. H02m 5/14, 5/16, 5/30
U.S. Cl. 321—7                                                    4 Claims

ABSTRACT OF THE DISCLOSURE

An electrical converter circuit for supplying a load with a variable frequency alternating current from an alternating current supply source of constant frequency. One side of the load is connected directly to one side of the A.C. supply source and the other side of the load is connected indirectly to the other side of the A.C. supply source through a rectifier bridge. The bridge includes uncontrolled rectifiers in those various bridge arms which are correlated respectively to the various phases of said load and a controllable rectifier such as a thyristor connected in the so-called direct current arm of the bridge common to current flow in all phases and which is supplied with control pulses at the desired load frequency so that the bridge functions only at such frequency.

---

This invention relates to converter circuits, especially for the speed control of brushless motors in both directions of rotation, wherein the control of one or more current rectifier elements is changed in successive periods of the mains, i.e. supply network frequency, in accordance with the desired output frequency for the motor, which is in a way similar to the known, so-called, envelope curve method for producing the voltage curve of the motor frequency.

For supplying three-phase motors with variable frequency, several methods have been proposed for producing from an alternating current (A.C.) mains a voltage with variable frequency and amplitude. For example, the voltage may be first rectified and supplied to a direct current (D.C.) intermediate circuit, and the D.C. voltage is transformed by inverters into a variable A.C. voltage. The voltage in the D.C. intermediate circuit can be variable or constant (see VDE Fachberichte 1964, pp. 225 et seq.).

It is also possible to convert the mains voltage of fixed frequency into a variable frequency motor voltage without a D.C. intermediate circuit, by separating from the mains voltage suitable instantaneous values from the voltage curve so that they give the required voltage shape after re-combining. These circuits, so-called direct converters, require a comparatively large number of controlled rectifier elements, as does the D.C. intermediate circuit arrangement at least four controlled elements being required per phase. When semiconductor elements are used as converter elements, the controlling semiconductors, i.e. thyristors are much more expensive than diodes. Thus, if the number of controlled semiconductor rectifiers can be reduced, the economy of the installation will be improved. More particularly, converter control can be introduced for smaller motors which hitherto could not be so equipped for reasons of economy.

According to the invention there is provided an electrical current converter circuit for supplying current at a desired frequency to a load from an A.C. mains supply, in which the load is connected on one side directly to the mains supply and on the other side to the mains supply through a rectifier arrangement consisting of uncontrolled rectifying elements, the said arrangement having a D.C. circuit in which is located a controlled rectifier element, control means being provided to apply to the controlled rectifier element control impulses during consecutive periods of the mains frequency to provide said desired frequency at the load.

This has the advantage that only a single controlled rectifier is required if the mains and the load have the same number of phases. Only in special cases, or where the number of phases is not the same, a maximum of three controlled rectifier elements may be required.

With this circuit it is only necessary to ensure that the quenching of the individual controlled element or elements may be effected when required. This can be effected by quenching circuits. In addition, the reactive load current of the motor must be capable of flowing when the controlled element is just in the non-conducting state. It has been found that this is possible in the same manner with the same simple means in each rectifier circuit, even with only a single controlled element.

Suitable embodiments of the invention will be further explained with reference to the accompanying drawings, in which:

FIGURE 5 shows a circuit for converting single phase A.C. current at constant frequency into variable-frequency three-phase current.

Figure 1:
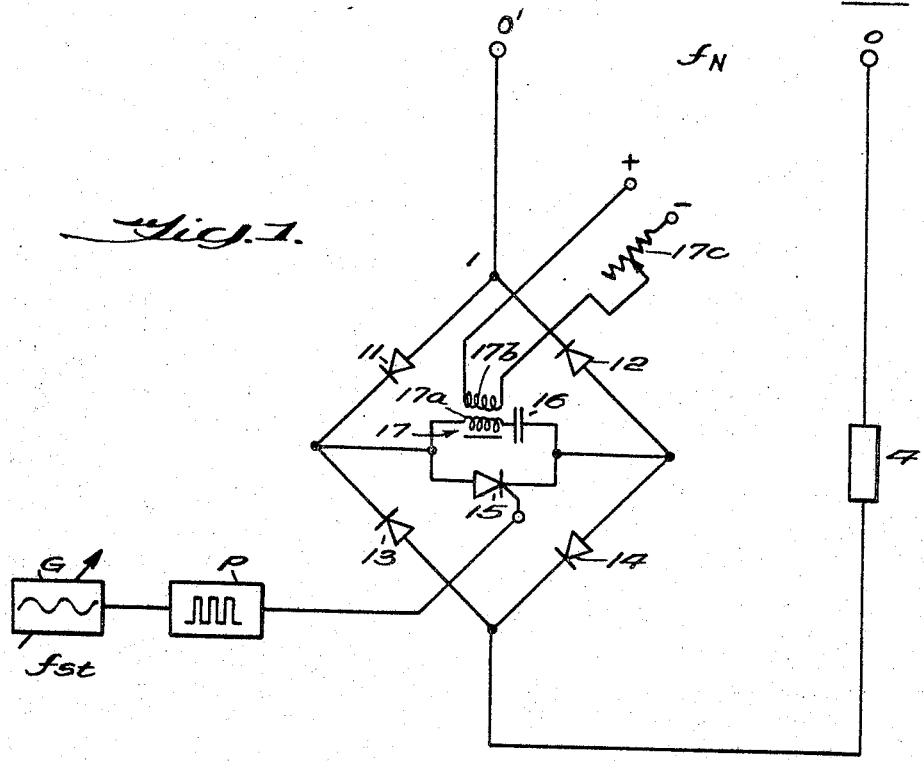
FIGURE 1 shows a circuit for the conversion of single phase A.C. current with constant frequency into single-phase A.C. current with variable frequency and voltage.

With reference now to the drawings, FIGURE 1 shows single phase constant-frequency mains voltage terminals O, O'. The load 4 is connected on one side directly to terminal O and on the other side to terminal O' via a single phase full wave bridge converter 1 consisting of diodes 11 to 14. The D.C. branch of the bridge comprises a single thyristor 15 with an associated or quenching arrangement, a capacitor 16 and a pre-magnetized saturable reactor 17 having a substantially rectangular magnetization curve. The main winding of the reactor is indicated at 17a and the biasing, i.e. the pre-magnetizing winding is indicated at 17b. The amount of the bias can be adjusted by means of a variable resistor 17c connected in the energizing circuit for winding 17b from a suitable voltage source indicated by the conventional + and − symbols.

The thyristor is controlled by pulses received at its base from the output of a pulse former P which produces rectangular pulses at a frequency $f_{St}$ from a sinusoidal input produced by generator G operating at this same frequency. Thyristor 15 completes the D.C. branch when it is conducting, so that current may flow through the load 4. When the thyristor is conducting, current may flow through the load 4 in one direction or another and at a level in accordance with the instantaneous mains value.

Figure 2:
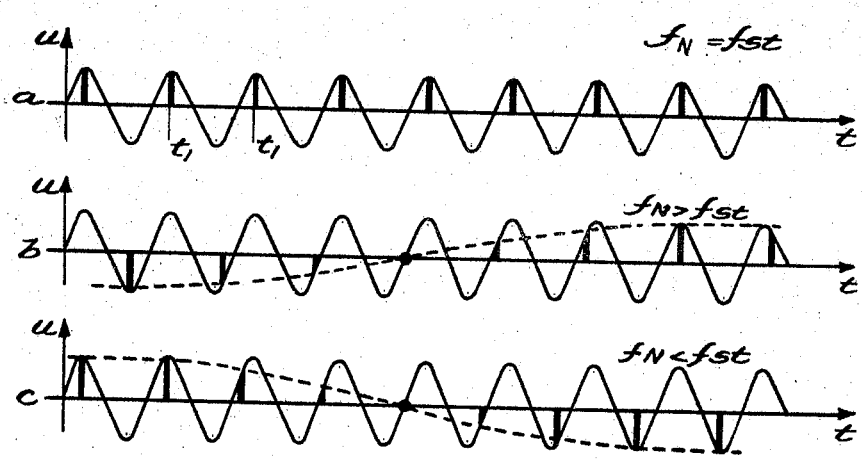
FIGURES 2a, 2b and 2c show the voltage curve as a function of the time.

The operation will now be explained in greater detail with reference to FIGURES 2a to 2c. The control for the thyristor 15 i.e. pulse former P supplies impulses at a certain frequency. This frequency determines the frequency applied to the load. In FIGURE 2a, the pulse frequency $f_{St}$ is equal to the mains frequency $f_N$, i.e., $f_N = f_{St}$. The thyristor 15 is triggered at the moment $t_1$, for example, which falls at the same point in each period. Without a quenching circuit, the thyristor would carry current until the current passes through zero. However, the quenching circuit (16, 17) assures quenching after a shorter time. A certain impulse width is formed which depends substantially on the bias magnetization of the reactor 17. After the ignition of the thyristor 15, the capacitor 16 is discharged, causing the magnetization of the reactor 17 to be reversed. Owing to the weak attenuation of the quenching circuit, the discharge of the capacitor has the form of an oscillation so that after the termination of the remagnetization of the reactor, the capacitor is charged at the opposite polarity. The subsequent discharge of the capacitor in the blocking direction of the thyristor takes place in the saturated range of the reactor. The discharge current rises practically without resistance and quenches the thyristor. The resulting time during which the thyristor is conducting corresponds to the remagnetization period of the reactor 17. By changing the reactor bias current, i.e. by changing the amount of its premagnetization, this conducting period may be altered at will. In this way, the current in the load 4 may be switched on and off at times selectable at will. If, as shown in FIGURE 2a, the thyristor 15 is triggered in synchronization with the mains voltage, there occur, with constant bias magnetization of the reactor 17, voltage impulses with uniform height and width, i.e. a direct current is formed which pulsates with the mains frequency. The height of the impulses depends on the phase position of the control impulses relative to the amplitude of the mains voltage. By changing this phase position it is possible, with constant frequency, to change the D.C. voltage at the load from a positive maximum value continuously down through zero to a maximum negative value.

If the thyristor is triggered at a control frequency $f_{St}$ which is larger or smaller than the mains frequency $f_N$, the voltage applied to the load varies at the frequency $f_N - f_{St}$. FIGURE 2b shows a mains frequency which is greater than the control frequency, and in FIGURE 2c, the mains frequency is less. In either case, the ignition point of the thyristor is in a different position in each period of the mains frequency. The width of the ignition impulse remains the same so long as the bias magnetization is not changed. It may be seen that the load A.C. voltage formed will have a lower frequency than the mains frequency. The difference between the cases of FIGURES 2b and 2c is immaterial for a single-phase circuit, but becomes important for three-phase circuits to enable the sense of rotation to be controlled.

Figure 3:
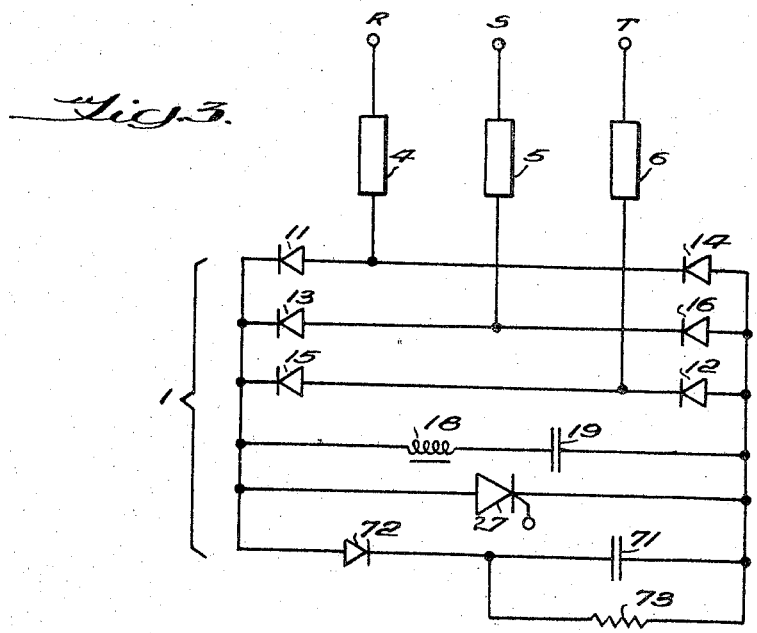
FIGURE 3 shows a circuit for converting constant-frequency three-phase current into variable-frequency three-phase current, serving as supply for a squirrel-cage induction motor.

FIGURE 3 shows a converter for three-phase current. In principle, the operation of the circuit is the same as in FIGURE 1. Reference numerals 4, 5 and 6 represent the windings of a squirrel-cage motor supplied by the converter circuit 1. The windings are connected directly to respective phase R, S, T of a constant frequency three-phase mains supply and are periodically energized via diodes 11 to 16 of a three-phase bridge using a single thyristor 27 located in the D.C. arm of the bridge, which thyristor opens i.e. conducts and interrupts the bridge periodically according to the control frequency. As in FIGURE 1, the thyristor is quenched by a quenching circuit, reactance 18 and capacitance 19. The thyristor 27 is triggered by means of control pulses produced in the same manner as illustrated for the embodiment of FIG. 1. This reactance 18 also is provided with a regulatable premagnetizing winding in the same manner as for the FIG. 1 arrangement. However, in the interest of simplifying the drawing these circuit details have not been included. If the thyristor 27 is triggered at mains frequency, a D.C. voltage is formed across each winding of the motor. If, on the other hand, the thyristor 27 is triggered at a control frequency $f_{St}$ which is higher or lower than the mains frequency $f_N$, there occurs at each motor winding an A.C. voltage with the frequency $f_N - f_{St}$. Owing to the blocking effect of the diodes 11 to 16, the three motor phases are shifted through 120° relative to each other for all frequencies. If the sign of the difference frequency $f_N - f_{St}$ changes, this causes a change in the direction of the rotating field and thus in the direction of rotation of the motor. The maximum frequency possible at the motor is equal to the frequency of the mains supply.

In order to enable the reactive motor current to continue to flow during the quenching time of the thyristor, a capacitor 71 is connected in parallel to the thyristor 27. A diode 72 prevents the discharge of this capacitor 71 through the thyristor 27. The resistor 73 is the discharge resistor for the capacitor 71.

Figure 4:
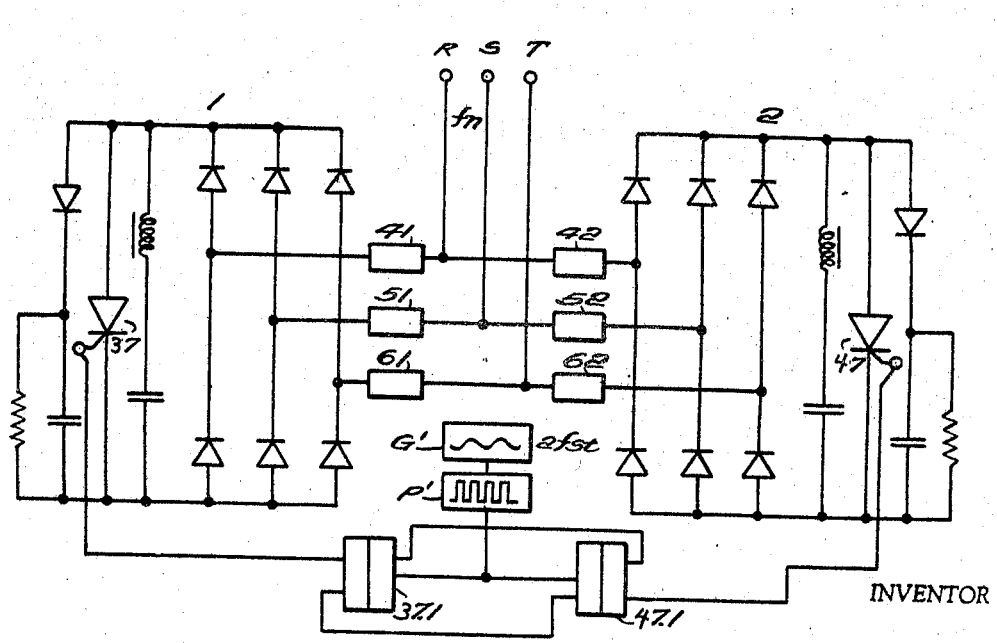
FIGURE 4 shows a modification of FIGURE 3 having a wider frequency range.

In the circuit of FIGURE 4, the maximum possible frequency is not limited by the mains frequency. Two three-phase bridge converters 1 and 2 are provided, and both operate in the same way as the converter 1 in FIGURE 3. Thus, there are two thyristors 37 and 47 which are rendered conductive in alternation so that during half-periods of the mains voltage, positive and negative impulses may be applied in succession to the windings of the motor. Here, the motor has two windings per phase, namely, windings 41 and 42, 51 and 52, 61 and 62. The windings of each pair are offset in phase through 180° and connected to the respective three-phase converter bridges. The mains supply is connected at the junctions between the two windings of each phase.

In order to obtain the desired alternate conduction of thyristors 37 and 47 there is employed a generator G' which produces a sinusoidal voltage wave having a frequency $2f_{St}$, this voltage being fed into a pulse former P' which converts the sinusoidal voltage to rectangular pulses having the same frequency. The output from pulse former P' is applied to a pair of multivibrator units 37.1 and 47.1 each having an "And" logic unit in its input stage. The outputs from the multivibrators 37.1 and 47.1 are connected respectively to the bases of thyristors 37 and 47 for the purpose of rendering them conductive in an alternating manner. The multivibrators are combined to form a ring counter so that when a pulse from the pulse former P' arrives at multivibrator unit 37.1 a pulse is generated at its output end which will be conveyed to the base of thyristor 37. However, at the same time, a pulse is applied across multivibrator 47.1 but which, however, will switch over only upon arrival of the next following pulse from the pulse former P'. A pulse is then produced at the base of thyristor 37 and at the same time a pulse will return to multivibrator unit 37.1 which in turn will switch over only upon arrival of the next following pulse from the pulse former. In this manner, triggering pulses to the bases of thyristors 37 and 47 will always be applied in alternation.

FIGURE 5 shows a further embodiment for converting constant frequency single phase alternating current into variable frequency three-phase current. Here, the three-phase load 4, 5, 6 is connected at one pole directly to the single phase mains supply at O, whilst the other ends of the load are connected to the A.C. supply at O' through respective single-phase full-wave bridge converters 1, 2, 3. The converters 1, 2, and 3 correspond to converter 1 of FIGURE 1, and their operation is also the same.

The respective energizations of the premagnetizing windings 17b of the reactors 17 of the three converter units is seen to be combined into a single circuit and which is provided with a variable resistance 17c to adjust the premagnetizing current simultaneously in the reactors of all converter units. In order to obtain the necessary 120° phase displacement in the successive operation of the three converter units, the system of FIG. 5 utilizes a sinusoidal wave generator G'' having an operating frequency of $3f_{St}$ which feeds into a pulse former P'' producing rectangular output pulses of the same frequency. These pulses are fed to a ring counter composed of three multivibrator units 57.1, 67.1 and 77.1 having "And" logic components at their inputs and which function respectively to supply triggering pulses 120° apart to the respective thyristors 57, 67, 77 of the three converter units. The first switching takes place at the multivibrator 57.1 which transmits a pulse to the appropriate thyristor 57 as well as to multivibrator 67.1. The latter will produce in turn another pulse when the next pulse arrives from the pulse former and switches, with the pulse its own thyristor 67, transmitting at the same time a pulse to multivibrator 77.1 which will forward a pulse to its associated thyristor 77 only upon arrival of the next pulse from the pulse former.

In conclusion, the invention is not restricted to the use of thyristors, and may be used similarly for mercury vapour rectifier elements. It is also possible to construct devices in which the controlled rectifier element is arranged in the D.C. circuit of a diode center circuit which may be single or multiphase. The invention is therefore not limited to rectifier bridge circuits.

I claim:

1. In an electrical current converter circuit for supplying three phase current at a desired frequency to a three-phase load from a three-phase alternating current supply means convertible into a three-phase load current with an adjustable frequency, the combination comprising circuit means directly connecting one side of each of the three different phases of said load to the corresponding phases of said alternating current supply means, means interconnecting the other sides of each of said different phases of said load, said interconnecting means including a three-phase rectifier bridge circuit having uncontrolled rectifier elements in those bridge arms correlated respectively to the various phases of said load and a controllable rectifier having a control element in the direct current arm of the bridge which is common for all phases of said load, and means supplying said control element of said controllable rectifier with triggering control pulses at the desired load frequency during consecutive periods of said alternating current supply mains thereby to establish the three-phase current of the desired frequency in said load.

2. A converter circuit as defined in claim 1 and which further includes a quenching circuit for said controllable rectifier and which is connected in parallel therewith, said quenching circuit including a saturable reactor provided with a main winding and variable premagnetization winding, and said main winding being connected in series with a capacitor, said variable premagnetization winding serving to control the duration of conductivity of said controllable rectifier.

3. A converter circuit as defined in claim 2 and which further includes an additional capacitor connected in parallel with said controllable rectifier by way of an additional uncontrolled rectifier, and a discharge resistor connected in parallel with said additional capacitor.

4. In an electrical current converter circuit for supplying three-phase current at a desired frequency to a three-phase load from a three-phase alternating current supply mains convertible into a three-phase load current with an adjustable frequency and wherein each of the three phases of said load is split into two parts offset in phase by 180°, the combination comprising circuit means connecting one side of each of the two parts of each load phase directly to the corresponding phase of said three-phase alternating current supply mains, first circuit means interconnecting the other sides of a first group of three different load phase parts and which includes a first three-phase rectifier bridge circuit having uncontrolled rectifier elements in those bridge arms correlated respectively to the various phases of said load and a first controllable rectifier having a control element in the direct current arm of the bridge which is common for all phases of said load, second circuit means interconnecting the other sides of a second group of three different load phase parts and which includes a second three-phase rectifier bridge circuit having uncontrolled rectifier elements in those bridge arms correlated respectively to the various phases of said load and a second controllable rectifier having a control element in the direct current arm of the bridge which is common for all phases of said load, and means for applying control pulses in alternation to said control elements of said first and second controllable rectifiers at the desired load frequency during consecutive periods of said alternating current supply mains thereby to establish the three-phase current of the desired frequency in said load.

References Cited

UNITED STATES PATENTS

| | | | |
|---|---|---|---|
| 3,148,323 | 9/1964 | Blake et al. | 321—69 X |
| 3,197,691 | 7/1965 | Gilbert | 321—18 |
| 3,246,231 | 4/1966 | Clarke | 321—69 |
| 3,247,432 | 4/1966 | Robinson | 318—227 X |
| 3,348,110 | 10/1967 | Koppelmann | 318—227 |

JOHN F. COUCH, *Primary Examiner.*

W. H. BEHA, JR., *Assistant Examiner.*

U.S. Cl. X.R.

318—227, 231; 321—27, 69